Jan. 9, 1968     H. G. LIVERANCE     3,362,507
MOTOR VEHICLE EMERGENCY BRAKE MECHANISM
Filed Dec. 14, 1965     2 Sheets-Sheet 1
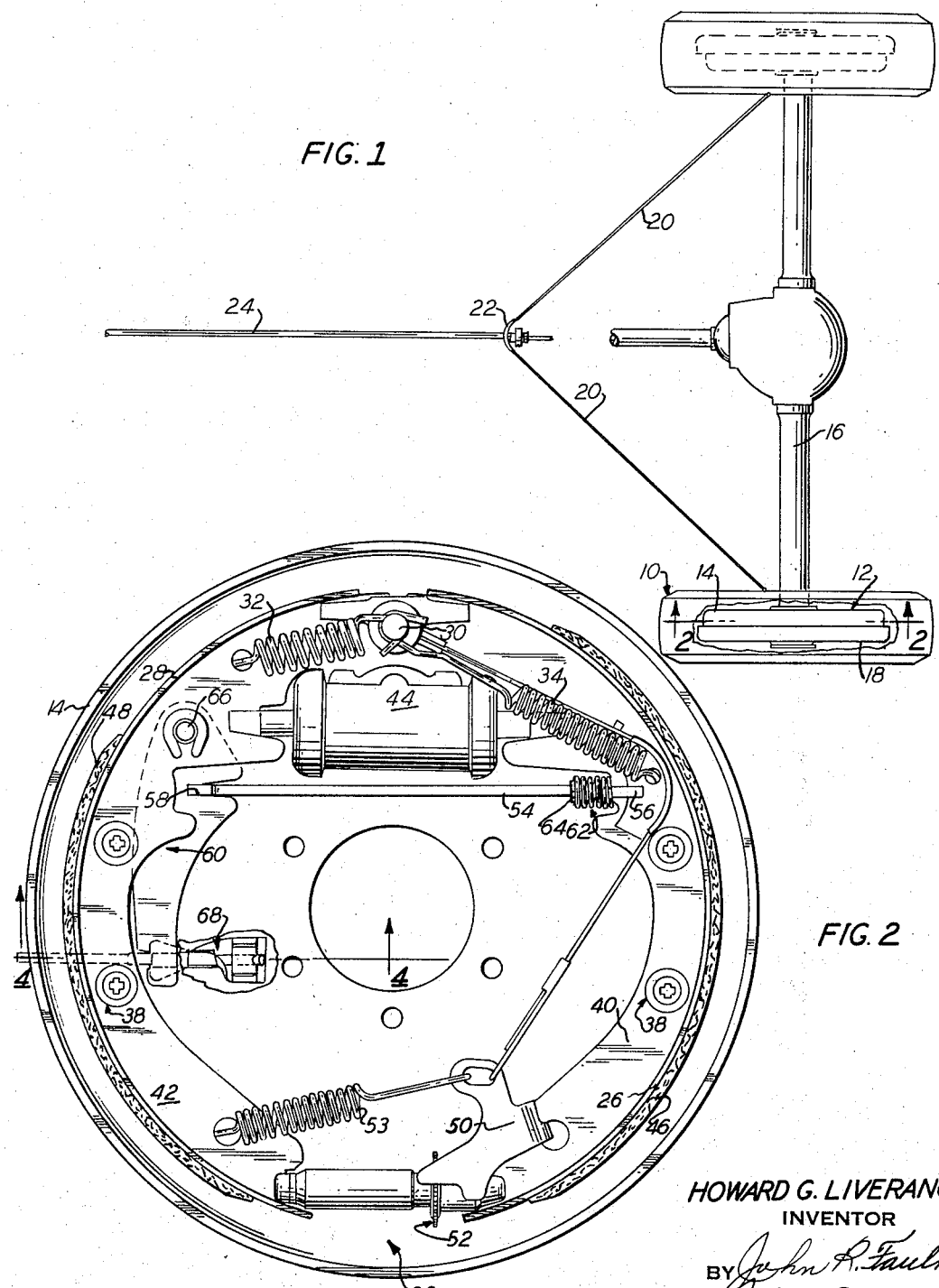
HOWARD G. LIVERANCE
INVENTOR
BY John R. Faulkner
Robert E. McCollum
ATTORNEYS

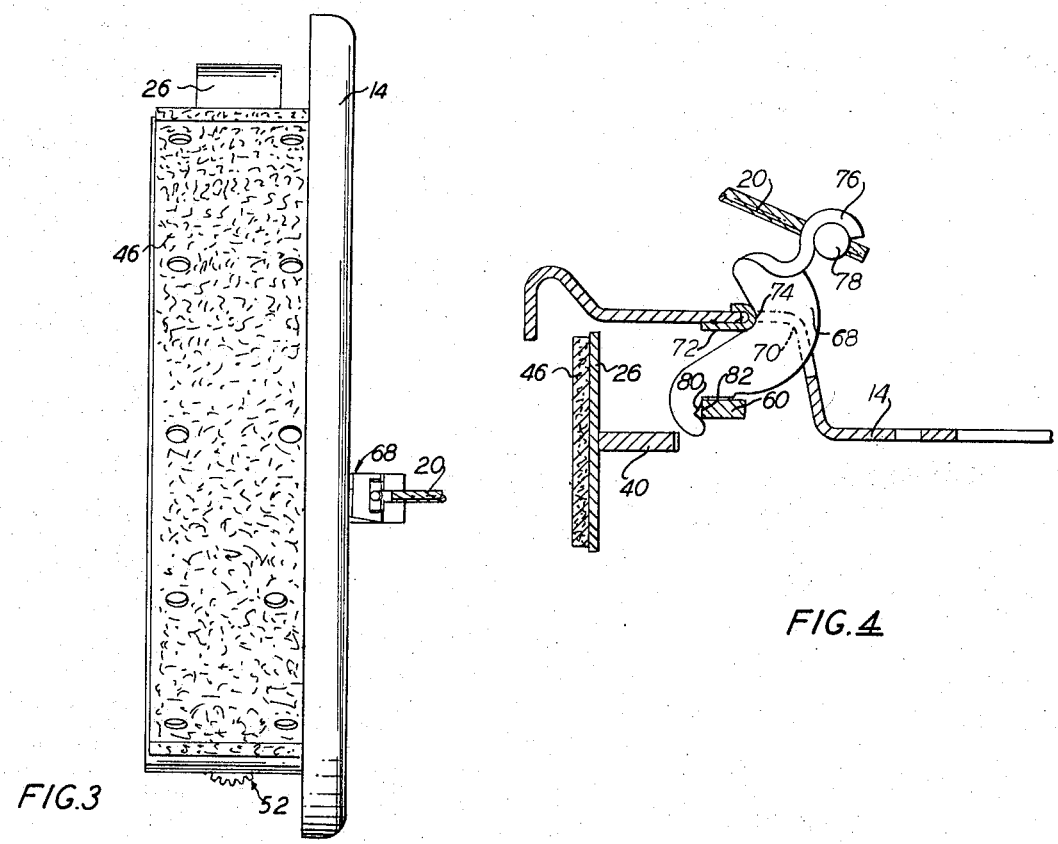

United States Patent Office 3,362,507
Patented Jan. 9, 1968

3,362,507
MOTOR VEHICLE EMERGENCY BRAKE
MECHANISM
Howard G. Liverance, Riverview, Mich., assignor to Ford Motor Company, Dearborn, Mich., a corporation of Delaware
Filed Dec. 14, 1965, Ser. No. 513,764
5 Claims. (Cl. 188—78)

This invention relates, in general, to a motor vehicle brake actuator. More particularly, it relates to a mechanically operated vehicle parking or emergency brake linkage to prevent motion of the vehicle in either direction.

Conventional internal shoe type brake assemblies generally consist of a drum secured to the wheel of a motor vehicle and cooperating with a pair of arcuately spreadable primary and secondary brake shoes secured to the axle housing. The shoes generally are interconnected at one end by a pivot nut assembly, and at their opposite ends are alternately abuttable against an anchor pin, depending upon the direction of rotation of the drum. Depression of the service brake pedal hydraulically actuates the wheel cylinders to spread the shoes against the drum, the brakes usually having a self-energizing or wrapping action in at least the forward direction of rotation of the drum. With such a construction, the brake shoes have a unitary short circumferential movement relative to the anchor pin each time the direction of motion of the vehicle is reversed.

In substantially all of the above type brake constructions, a separate mechanically operated linkage is provided to apply the rear wheel brakes for emergency braking or for parking the vehicle. This generally consists of a lever pivoted to one of the shoes and arcuately movable to spread the shoes in a manner similar to what is done hydraulically by the wheel cylinders.

In most of the constructions prior to this invention, however, the mechanical brake system lever at the brake assembly is connected by a cable or similar push-pull device to the passenger compartment moved brake lever, and in such a way that it requires a greater pull on the brake cable to prevent reverse motion of the vehicle than to prevent forward motion. This is due to the fact that the actuating force of the brake cable generally is applied to the shoe mounted lever along a line that is substantially parallel to or in line with a circumference line of the brake shoe. Since the length of the brake cable is usually adjusted to prevent forward motion of the vehicle, when the vehicle moves backwardly, the reversal of direction of rotation of the drum circumferentially rotates the shoes in the same direction. This introduces slack in the brake cable, permitting the shoes to move slightly away from the drum, for the same setting of the operator's brake lever.

It will be clear, therefore, that if the vehicle is parked on a hill with the emergency brake lever moved to a position just sufficient to prevent forward motion, that slack will occur in the cable if the vehicle moves rearwardly, and a greater pull on the cable will be necessary to prevent reverse motion.

The invention relates to an emergency brake linkage that is operable to prevent vehicle motion in either direction for the same setting of the emergency brake lever or pedal. The invention provides a shoe mounted parking brake lever that is engaged by a brake cable along a contact surface that is coincident with a circumference line of the brake shoe or assembly. The line of application of force passes essentially along a radius of the brake drum, and therefore any circumferential movement of the shoes due to a change in direction of motion of the vehicle results in essentially no change in the tension of the brake cable. In other words, the brake shoes have a movement along a line that is substantially at right angles to the direction of application of force to the brake lever so that the movement does not create any slack in the brake cable.

It is, therefore, an object of the invention to provide an improved parking and emergency brake linkage for a motor vehicle.

It is another object of the invention to provide a parking brake linkage that applies substantially an equal braking force to the wheel regardless of the direction of motion of the vehicle.

It is a still further object of the invention to provide a parking brake linkage in which an operator movable brake cable contacts a shoe mounted brake lever along a surface that is essentially coincident with a circumference line of the brake assembly, and the braking force is applied essentially along a line that is substantially at right angles to the contact surface and substantially coincident with a radius line of the brake assembly.

Other objects, features and advantages of the invention will become apparent upon reference to the succeeding, detailed description thereof, and to the drawings illustrating the preferred embodiment thereof; wherein, FIGURE 1 shows a plan view, with parts broken away, of a motor vehicle axle assembly incorporating the invention;

FIGURE 2 is an enlarged cross-sectional view taken on a plan indicated by and viewed in the direction of the arrows 2—2 of FIGURE 1;

FIGURE 3 is a side-elevational view of the brake assembly shown in FIGURE 2; and FIGURES 4 and 5 are cross-sectional views taken on a plane indicated by and viewed in the direction of the arrows 4—4 of FIGURE 2, and illustrating the mechanical brake system linkage in released and actuated positions, respectively.

FIGURE 1 shows the rear axle assembly of a motor vehicle, the left rear wheel 10 being cut away to show the brake assembly 12. The assembly includes a carrier or backing plate 14 fixed to the rear axle housing 16, and interfitted with a conventional brake drum 18 fixedly secured for rotation with the driving wheel 10. Also shown is a single brake cable 20 that is connected, in a manner to be described, to the emergency or parking brake linkage for each wheel. Cable 20 is connected by an equalizer bar 22 in a known manner to a common actuating cable 24 that terminates forwardly in the motor vehicle operator's compartment with an attachment to the conventional pivotally mounted emergency brake lever or pedal, not shown.

FIGURE 2 shows an enlarged cross-sectional view of a self-energizing type brake assembly embodying the invention, and, which, except for the parking brake mechanism, is conventional. In general, it includes primary and secondary brake shoes 26 and 28 biased towards each other and against an anchor pin 30 by the usual retraction springs 32 and 34. The shoes are interconnected at their opposite ends by a brake lining wear adjusting mechanism 36. Suitable hold-down springs 38 retain the shoe webs 40 and 42 against carrier plate 14, and the shoes are arcuately spreadable in a known manner upon application of fluid to a wheel cylinder 44.

Further details of construction and operation of the hydraulically actuated portion of the brake are not given since they are known (see U.S. 2,345,107; 2,941,335; and 2,938,610, for example) and believed to be unnecessary for an understanding of the invention.

Suffice it to say that when the conventional brake pedal (not shown) is depressed, fluid under pressure is supplied to cylinder 44 to arcuately spread the primary and secondary shoes 26 and 28 outwardly to contact brake drum 18 (FIGURE 1). If the drum is rotating in a forward or clockwise direction, the shoes will rotate clockwise by a small amount until the upper edge of the web 42 of secondary shoe 28 abuts anchor pin 30. The continued outward spreading of the shoes will then provide a self-energizing action causing the brake shoes to wrap tigher on drum 18 and provide a greater braking effort.

When the brake drum is rotated in the opposite or counterclockwise direction, the reverse operation occurs; that is, the outward movement of the shoes against brake drum 18 will cause a counterclockwise rotation of shoes 26 and 28 until primary shoe 26 abuts anchor pin 30, and then the brakes will engage fully.

If the brake linings 46 and 48 should wear to a point where outward movement of shoes 26 and 28 pulls adjusting lever 50 upwardly out of engagement with the teeth of the adjusting screw cog 52, its return movement against the teeth of the adjusting screw by spring 53, when the brakes are released, will rotate the screw and spread the pivot nut and socket to arcuately move the brake shoes outwardly to compensate for the wear in the lining.

Turning now to the invention, the brake assembly shown in FIGURE 2 includes a pendulum link 54 that is located at one end in a slot 56 in primary shoe web 40 and at its opposite end in a slot 58 in a lever 60. A spring 62, positioned between the edge of web 40 and a washer 64 fixed to link 54 biases the link against lever 60. This latter lever is pivotally connected at one end by a pin 66 to secondary shoe web 42. At its opposite end, it is engaged by a cross lever 68 shown more clearly in FIGURES 4 and 5.

Cross lever 68 is essentially a bellcrank lever that extends through an appropriate slot 70 in the backing or carrier plate 14. A substantially U-shaped pivot member 72 is secured to the backing plate to cooperate with the apex portion 74 of cross lever 68 to act as a fulcrum for pivotal movement of the lever. The outer end 76 of cross lever 68 has a yoke-like shape for gripping a cylindrical fastener 78 fixedly secured to brake cable 20. The opposite end of lever 68 has an essentially spread-U or claw-shaped contact surface 80 that engages the edge 82 of parking brake lever 60 (also see FIGURE 2).

It should be noted that cross lever 68 is disposed essentially at right angles to the plane of movement of parking brake lever 60 so that the line of application of force acting on lever 60 to pivot it about pin 66 is essentially along a radius of the brake drum 18. It should also be noted that the contact surfaces 80, 82 between cross lever 68 and lever 60 are essentially on a circle concentric with a circumferential line of the brake drum or assembly. As a result, it will be seen that when the brake shoes are rotated in one direction or the other upon initial engagement with the rotating drum 18, that the circumferential movement essentially will not change the relative positions of the brake lever 60 and cross lever 68 from that shown in FIGURE 4. This is, circumferential movement of the brake shoes to accommodate for a reversal in direction of vehicle movement merely moves the parking brake lever 60 out of the plane of FIGURE 4, but not laterally with respect to the cross lever contact surface 80. As a result, there is no clockwise pivotal movement of cross lever 68 upon a reversal in direction of brake actuation; and, accordingly, there is essentially no change in the tension of brake cable 20.

In operation, when the parking brake lever in the driver's compartment is released, a spring (not shown) will move cross lever 68 and lever 60 to the released positions shown in FIGURE 4. When the brake lever or pedal is actuated and locked into position, the predetermined tension on cable 20 pivots cross lever 68 counterclockwise to the FIGURE 5 position, moving lever 60 to the right. This results in an arcuate counterclockwise movement (FIGURE 2) of lever 60 to spread shoe 26, and thus shoe 28, to fully apply the brakes. If the vehicle should attempt to move either forwardly or reversely, the rotational tendency of drum 18 will rotate shoes 26 and 28 in the same direction to abut whichever shoe is serving as the reaction member against anchor pin 30. It will be noted, however, that this is a circumferential movement of lever 60, and since its contact surface 82 is substantially coincident with a circumference line of the shoe, essentially no change in the radial distance of the contact surface 80 from the axis of rotation of drum 18 will occur.

From the foregoing, therefore, it will be seen that the invention provides a motor vehicle parking brake mechanism that is effective regardless of the direction of movement of the vehicle.

While the invention has been illustrated in its prefered embodiment in the figures, it will be clear to those skilled in the arts to which the invention pertains that many changes and modifications may be made thereto without departing from the scope of the invention.

I claim:
1. A brake comprising arcuate primary and secondary shoes spreadable against a rotatable drum and having a limited sliding movement circumferentally with respect to said drum, said shoes being operatively interconnected at one end and alternately abuttable at their opposite ends against an anchor means in accordance with the direction of rotation of said drum, a brake lever having a longitudinal axis essentially concentric with that of one of said shoes and being pivotally connected to said latter shoe and having means operatively connected to the other of said shoes for spreading said shoes upon arcuate movement of said lever in one direction, and force means connected to said lever for moving said lever in said one direction, the line of application of force by said force means extending essentially at right angels to the longitudinal axis of said lever and to a circumference line of said drum whereby when said shoes move circumferentally relative to said drum upon a reversal of rotation of said drum, the arcuate movement of said lever and force means is essentially laterally at right angles to the direction of the line of application of force to said lever thereby minimizing a change in the level of said force required for braking effort.

2. A brake as in claim 1, an extension of the line of application of force to said lever from said means passing close to the axes of rotation of said drum.

3. A brake as in claim 1, said force means comprising a lever having a longitudinal axis substantially at right angles to the line of contact between itself and said brake lever.

4. A brake as in claim 1, said force means comprising a bellcrank lever pivotally mounted on said brake and movable in a plane substantially at right angles to the plane of movement of said brake lever.

5. A brake as in claim 4, including means connecting said lever at a point located substantially on and in line with a radius of said drum.

References Cited

UNITED STATES PATENTS

| | | | |
|---|---|---|---|
| 2,109,091 | 2/1938 | Press | 188—78 X |
| 2,118,188 | 5/1938 | Gallup | 188—106 |
| 2,345,107 | 4/1944 | Goepfrich | 188—78 X |
| 2,509,643 | 5/1950 | House. | |

FOREIGN PATENTS 950,315  3/1949  France.

MILTON BUCHLER, Primary Examiner.

B. S. MOWRY, T. W. BUCKMAN, Assistant Examiners.